United States Patent [19]
Hasse et al.

[11] Patent Number: 5,276,309
[45] Date of Patent: Jan. 4, 1994

[54] FOOD CONDITIONING CHEST

[75] Inventors: David Hasse, McHenry; Curtis C. Pinnow, Libertyville, both of Ill.

[73] Assignee: Carter-Hoffmann Corporation, Mundelein, Ill.

[21] Appl. No.: 673,676

[22] Filed: Mar. 22, 1991

[51] Int. Cl.$^5$ .................. F24C 7/10; F24C 15/32
[52] U.S. Cl. .................. 219/400; 126/21 A; 432/200
[58] Field of Search .................. 219/400; 126/21; 312/236; 34/219, 224, 222; 62/255, 256, 309, 407, 413, 415, 416; 432/152, 199-202; 454/234-236, 243-245

[56] References Cited

U.S. PATENT DOCUMENTS

| | | |
|---|---|---|
| 3,747,513 | 7/1973 | Seelbach . |
| 3,905,760 | 9/1975 | Johansson .................. 219/400 |
| 3,942,426 | 3/1976 | Binks .................. 219/400 |
| 3,962,962 | 6/1976 | Anderson .................. 219/400 |
| 4,233,495 | 11/1980 | Scoville .................. 219/400 |
| 4,722,683 | 2/1988 | Royer .................. 126/21 A |
| 4,869,155 | 9/1989 | Grieve .................. 219/400 |
| 4,954,693 | 9/1990 | Mitsuhashi .................. 219/400 |

FOREIGN PATENT DOCUMENTS 1484923  5/1967  France .
54540  10/1934  Norway .

*Primary Examiner*—Bruce A. Reynolds
*Assistant Examiner*—John A. Jeffery
*Attorney, Agent, or Firm*—Wood, Phillips, VanSanten, Hoffman & Ertel

[57] ABSTRACT

A food conditioning chest has a generally rectangular tub supported in the housing to define an upwardly opening food well for supporting foodstuffs. Louvered openings are formed in opposite end walls and the front wall and the rear wall of the tub. A return duct communicates with the food well through the openings formed in the end walls and transports return air to an intake chamber formed beneath the tub floor. An intake duct extends from the intake chamber and communicates with the food well through the openings formed in the front wall and the rear wall. A centrifugal fan positioned in the intake chamber circulates air from the return duct and the intake duct. As the air flows through the intake chamber, it passes over at least one heating element which heats the air to a desired temperature.

17 Claims, 3 Drawing Sheets

FOOD CONDITIONING CHEST

BACKGROUND OF THE INVENTION

1. Technical Field

The present invention relates to a food conditioning chest for storing foodstuffs and, in particular, to a food conditioning chest in which tempered air is circulated to preserve the foodstuffs.

2. Background Art

Food chests are conventionally used in the food services industry, wherein it is desired to preserve a large quantity of stored food over a relatively long period of time. Commonly, food chests are used in institutional environments, such as in schools or hospitals, in which many servings of food are stored in a food chest and are periodically dispensed for consumption by an individual. Often servings are continuously dispensed from a food chest as in a 'cafeteria line'-type usage.

Because of the large number of servings often stored within a food chest, the process of dispensing the servings can become quite protracted, and some servings may be stored in the chest for a relatively long time before they are ultimately dispensed. In order to adequately preserve the food, it is therefore important that food chests have some capability of maintaining food stored therein in a proper condition. Normally food servings must either be kept refrigerated, requiring that heat energy be drawn from the interior of the food chest, or the food servings must be continuously warmed, requiring that heat be supplied to the interior of the food chest.

One approach to conditioning food contained within a food chest has been to circulate conditioned air about the food. Air is drawn from openings in the chest and then appropriately conditioned, as by heating or cooling the air. Conditioned air is then forced back into the food chest to transfer thermal energy between the interior of the chest and the air to thereby condition the food. The efficiency with which the food is conditioned is directly related to the amount and the condition of air which is circulated within the food chest.

One proposed air circulating system is shown in U.S. Pat. No. 3,962,962 to Anderson. Anderson discloses a hot cabinet server in which pre-packaged foods are stored in a rectangular bin. The bin has opposite upright side walls having vent openings to allow air to flow into and out of the bin, with both inlet vents and outlet vents provided on the same side of the bin. A common fan draws air from the bin through the outlet vents and attempts to force air into the bin through the adjacent inlet vents, such that the proximate, opposed flows impede air circulation and limit the efficiency with which conditioned air can be supplied to the foods contained in the bin. More specifically, cool air is drawn upwardly out of the bin and tends to redirect the incoming, heated air such that heat is prevented from efficiently reaching the food at the bottom of the bin. In one form of the known air circulating system, air is drawn through only a single return side of the bin, further limiting air circulation.

In addition to the reduced volume of air which is circulated with the known device, because the pre-conditioned 'return' flow and the conditioned 'intake' flow are routed closely together, thermal losses further impede the efficiency of the food conditioning. On the sides of the bin having both inlet and outlet vents, pre-conditioned return air is drawn from the bin and travels in a path adjacent the conditioned intake air moving toward the inlet vents. Heat is conducted between the return and the intake flows and the efficiency of the food conditioning process is reduced.

Another problem with the Anderson structure occurs at startup. The unheated return air is drawn against the heater so as to effect cooling thereof. This lengthens the startup time for the device.

SUMMARY OF THE INVENTION

The present invention comprehends an improved food conditioning chest adapted for preserving foodstuffs contained within the chest by the efficient circulation of conditioned air about the foodstuffs.

In the exemplary embodiment of the invention, a food conditioning chest has an outer housing having an open top and a generally rectangular tub supported in the housing. The tub has a front wall and a rear wall spaced apart by opposite end walls and connected by a tub floor to define an upwardly opening food well for supporting foodstuffs within the food conditioning chest.

Louvered openings are formed in each of the opposite end walls and the front wall and the rear wall. A return duct communicates with the food well through the openings formed in the end walls. The return duct is positioned outside the food well and extends downwardly along each of the end walls and beneath the tub floor. An intake duct communicates with the food well through the openings formed in the front wall and the rear wall and extends downwardly along the outside of the tub to an intake chamber formed beneath the tub floor.

A centrifugal fan draws air from the food well through the openings formed in the end walls of the tub and through the return duct into the intake chamber. As the air flows through the intake chamber, it passes over a number of heating elements which heat the air to a desired temperature. Flow diverters positioned in the intake chamber direct the heated air toward the intake duct for delivery to the food well. Operation of the fan draws the heated air through the intake duct and into the food well through the openings formed in the front wall and the end wall.

BRIEF DESCRIPTION OF THE DRAWINGS

Other features and advantages of the invention will be apparent from the following detailed description taken in connection with the accompanying drawings wherein.

DETAILED DESCRIPTION OF THE INVENTION

Figure 1:
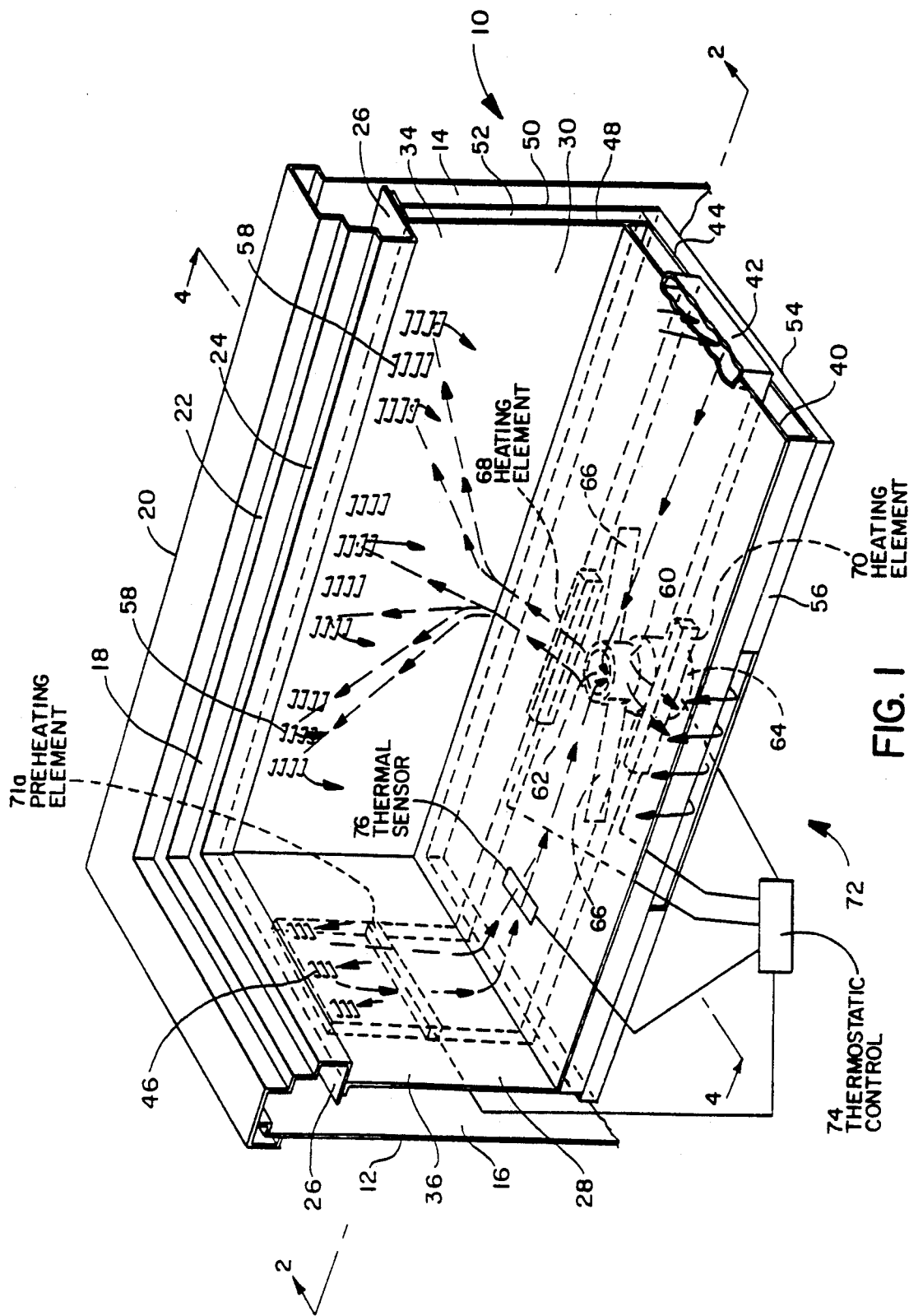
FIG. 1 is a fragmentary perspective view of a food conditioning chest according to the present invention.

In the illustrative embodiment of the invention disclosed in the drawings, a food conditioning chest generally designated 10 is shown to comprise an outer housing 12 having generally upright wall panels 14 and 16 formed of metal, wood or another known material suitable for the purposes described hereinbelow. Although not shown in the broken out view of FIG. 1, housing 12 has four successively connected wall panels defining a substantially rectangular open top 18.

A stepped railing 20 is supported by the upper edges of the housing wall panels 14 and 16 and extends completely around the periphery of the open top 18. Stepped railing 20 has a number of vertically spaced substantially horizontal steps 22 and 24 projecting inwardly of the housing wall panels 14 and 16 for slidably supporting covers (not shown) which selectively seal the open top 18 of the food chest 10 and permit access thereto. It should be understood that while the preferred embodiment shows a top access to the chest 10, the invention also comprehends access elsewhere through the housing 12.

The railing 20 cascades downwardly into the interior of the housing 12 and terminates in a substantially horizontal out-turned flange 26. As shown in FIG. 1, the out-turned flange 26 of the stepped railing 20 mounts an upwardly opening, generally rectangular tub 28 depending within the housing 12. The tub communicates with the open top 18 of housing 12 and defines a food well 30 for storing foodstuffs to be preserved within the food chest 10, as will be described below.

Figure 2:
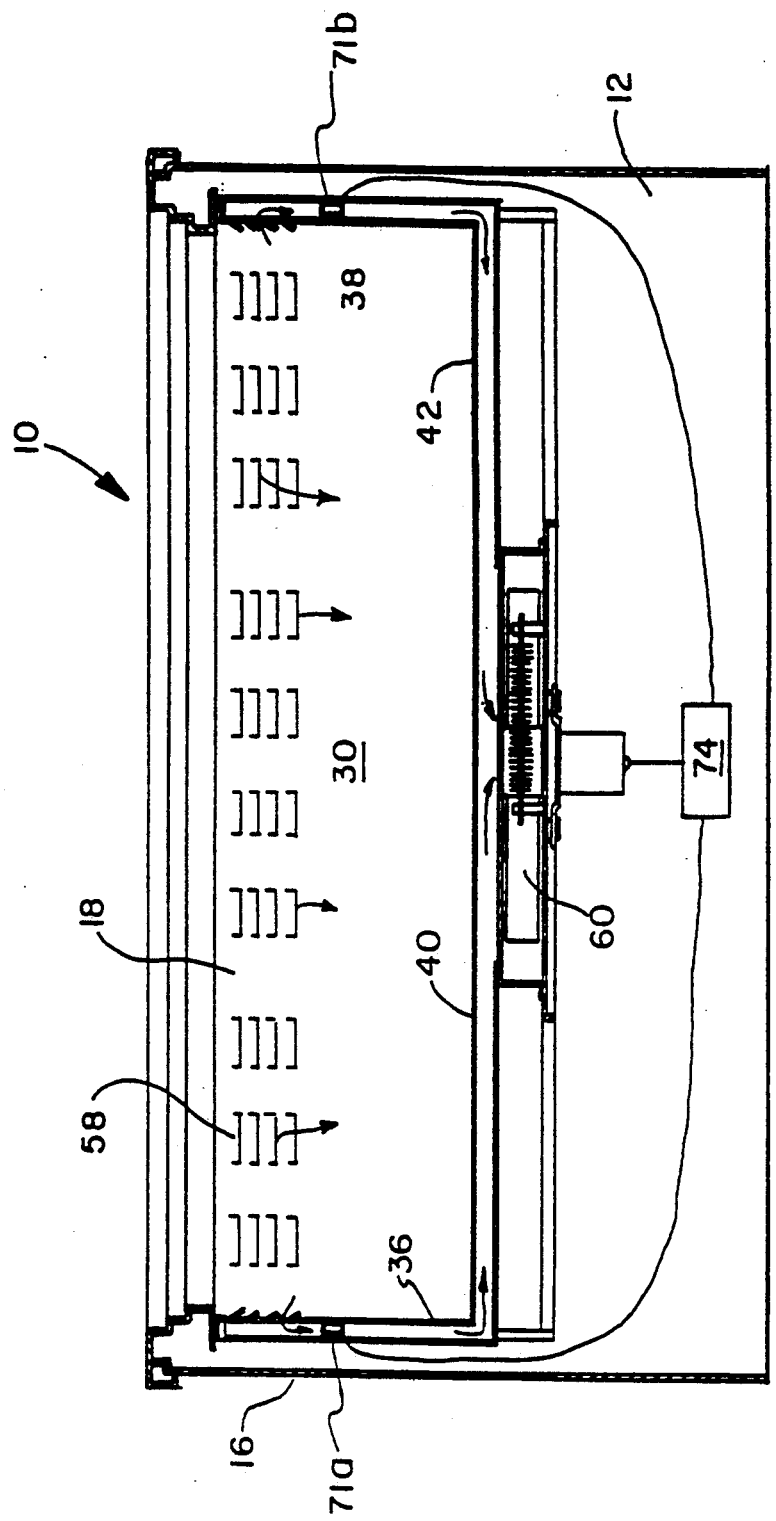
FIG. 2 is a front elevation view of the food conditioning chest illustrated in FIG. 1.
Figure 4:
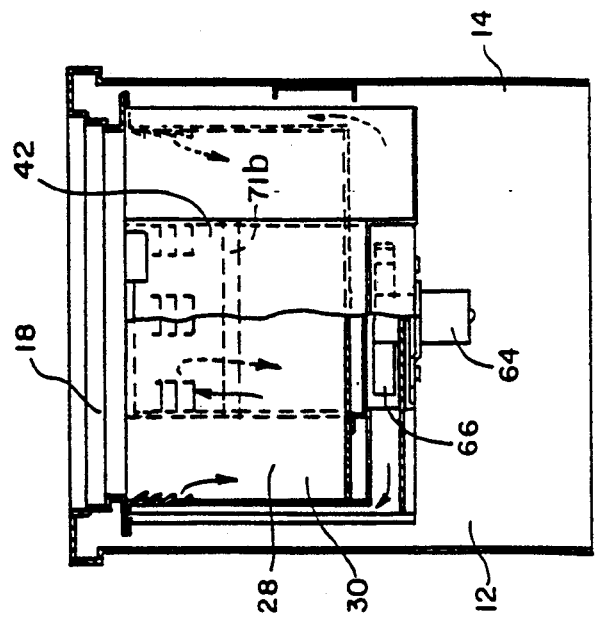
FIG. 4 is an end elevation view of the food conditioning chest illustrated in FIG. 1.
Figure 3:
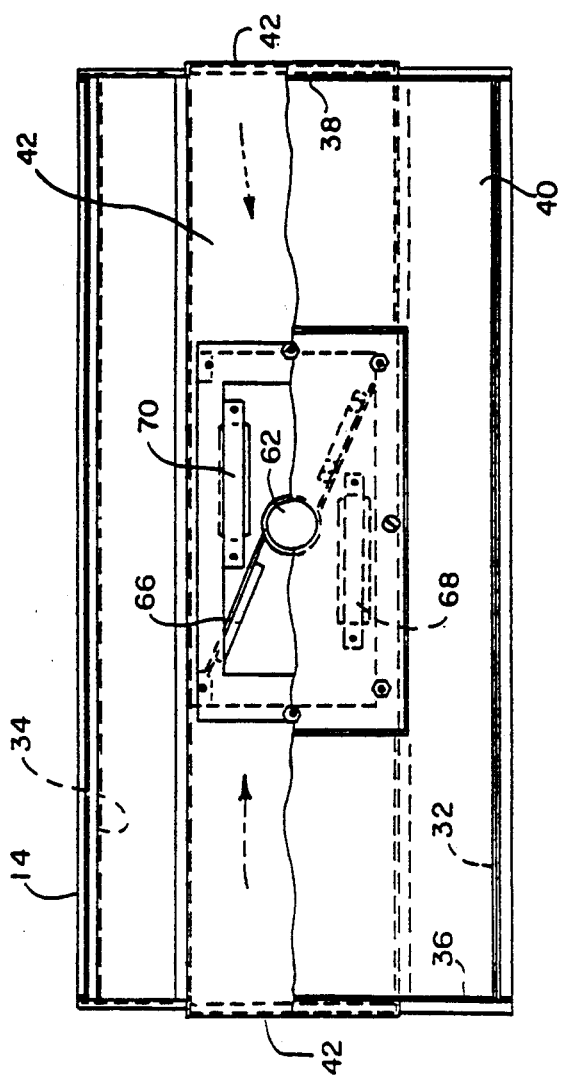
FIG. 3 is a plan view of the food conditioning chest illustrated in FIG. 1.

Referring also to FIGS. 2 and 3, rectangular tub 28 has an upright front wall 32 spaced apart from a substantially parallel rear wall 34 by a pair of opposite end walls 36 and 38. A generally horizontal tub floor 40 interconnects the bottom edges of front wall 32, rear wall 34 and end walls 36 and 38 and is adapted to support foodstuffs within the food well 30.

A generally U-shaped return duct 42 extends downwardly along the outer sides of opposite end walls 36 and 38 and across the bottom side of tub floor 40. Return duct 42 is supported beneath the tub floor 40 by means of a subfloor panel 44 connected to the bottom edges of tub walls 32, 34, 36 and 38 which extend downwardly beyond the tub floor 40. Return duct 42 communicates with the interior of the food well 30 through a plurality of downwardly angled louvers 46 formed in the end walls 36 and 38 approximately midway between the front wall 32 and the rear wall 34. As will be shown, return duct 42 is thereby effective to transport air away from the food well 30 for subsequent conditioning.

As best shown in FIG. 1, rear wall 34 has a double-wall construction and includes an inner panel 48 and a spaced outer panel 50 that together define an intake duct 52 within rear wall 34. Intake duct 52 extends between opposite end walls 36 and 38 from the upper edge of rear panel 34 downwardly toward the tub floor 40. Although not shown in the fragmentary view of FIG. 1, front wall 32 also has a similar double wall construction, with an intake duct extending between the upper edge of front wall 32 and the tub floor 40.

A second subfloor panel 54 is spaced below subfloor panel 44 in generally parallel relation to the tub floor 40 and extends between the bottom edges of front wall 32 and rear wall 34 to define an intake chamber 56 beneath subfloor panel 44. The intake chamber 56 together with the induct ducts 52 define a continuous U-shaped intake passage which extends downwardly from the upper edge of rear panel 34 between inner panel 48 and outer panel 50, forwardly between the subfloor panels 44 and 54, and upwardly between the spaced inner and outer panels of front wall 32. Intake chamber 56 communicates with the interior of food well 30 through a plurality of downwardly angled louvers 58 formed in front wall 32 and rear wall 34.

A feed fan 60 is centrally positioned in the intake chamber 56 and communicates with the return duct 42 through an opening 62 formed in subfloor panel 44. As shown in FIGS. 1 and 2, center feed fan 60 is a centrifugal fan driven by an electric motor 64 and is operable to draw air through the louvers 46 in opposite end walls 36 and 38 and through U-shaped return duct 42 into the intake chamber 56. Angled flow diverters 66 direct air beneath subfloor panel 44 outwardly towards intake ducts 52.

A pair of resistive heating elements 68 and 70 are mounted in the intake chamber 56 and are spaced oppositely about centrifugal fan 60. The heating elements 68 and 70 are arranged cooperatively with the angle flow diverters 66 such that air is forced across the heating elements as it flows through the intake chamber and towards intake ducts 52. Resistive preheating elements 71a and 71b are disposed in the return duct 42 adjacent the end walls 36 and 38 to begin heating the air drawn form the food well before the air reaches heating elements 68 and 70 to thereby minimize the time required to reach a startup temperature.

The electric motor 64, heating elements 68 and 70, and preheating elements 71a and 71b are arranged in a control circuit shown schematically at 72 which includes a thermostatic control means 74 adapted for selectively energizing and de-energizing the motor and the heating and preheating elements in response to the air temperature in the food well. A temperature feedback signal is generated by a thermal sensor means 76 immersed in the path of circulated air.

It is believed that operation of the food conditioning chest can be well understood from the above description and may be summarized as follows. Initially, food stuffs to be preserved are placed on the floor 40 of the food well 30 within the food chest. In order to circulate air about the food stuff, centrifugal fan 60 is energized as by motor 64 and air is drawn from within the food well through louvers 46 formed in the opposite end walls 36 and 38. The return air is continuously drawn downwardly through the upstanding legs of return duct 42 and across the preheating elements 71a and 71b which are energized in response to a temperature feedback signal from sensor means 76.

Preheated return air flows along the underside of tub floor 40, where it is subsequently drawn through the central opening 62 in subfloor panel 44 and introduced into the underlying intake chamber 56. Fan 60 directs a flow of air against the angled flow diverters 66 and across the resistive heating elements 68 and 70 towards intake duct 52. Because the air is preheated within the return duct 42, conductive losses are minimized as the air moves across the heating elements 68 and 70 which, as a direct result thereof, operate at increased efficiency.

Heated intake air then rises upwardly through the intake duct 52 under the combined influence of gravity and the centrifugal fan 60 and enters the food well 30 through the angled louvers 58 formed along the upper periphery of front wall 32 and rear wall 34. Because the louvers 58 are angled downwardly, heated intake air is directed towards the tub floor 40 to foodstuffs supported at the bottom of the food well are directly exposed to the flow of intake air. The streams of heated air from the opposite walls 32, 34 collide and resultingly bend downwardly to completely flood the well 30 from top to bottom with the conditioned air, which then flows laterally back into the return duct 42. Thermal energy is transferred from the intake air to the foodstuffs to warm the foodstuffs, and the cooled intake air is subsequently evacuated from the food well through the end walls 36 and 38.

The above-described invention provides a new and improved apparatus for achieving an efficient circulation of conditioned air about foodstuffs stored within a food well. Because the return flow and intake flow communicate with the interior of the food well through louvers formed in separate tub walls, the flows do not oppose each other and instead freely circulate about the food well in a substantially unobstructed manner. Further, because the preconditioned return air flows along different faces of the food well than the heated conditioned air, conductive losses between the return flow and intake flow are reduced and heat is more efficiently transferred with the interior of the food well.

It should be understood that the inventive system is usable in the same manner for heating and cooling of the well 30.

What is claimed is:

1. A food conditioning chest for subjecting foodstuffs contained therewithin to a continuous circulation of conditioned air, the food conditioning chest comprising:
    an outer housing having an open top;
    an upwardly opening tub supported in the housing and defining a food well communicating with the open housing top, the tub having at least two pairs of spaced, facing sidewalls cooperatively bounding one of a square and a rectangular space, the sidewalls connected by a tub floor extending below the open housing top and adapted to support foodstuffs within the food well;
    air circulation means including at least one fan for drawing return air from the food well through each of the walls of one of the sidewall pairs and for supplying intake air to the food well through each of the walls of the other sidewall pair in a continuous flow path; and
    air conditioning means disposed in the continuous flow path for conditioning air circulated therealong,
    said air circulation means including a plurality of groups of louvers in each of the walls of the other of the widewall pairs for directing intake air angularly downwardly and toward the other of the walls of the other of the sidewall pairs,
    there being one said group of louvers on each wall of the other wall pair located equidistantly from each of the walls in the one wall pair so that air supplied from each of the walls of the other wall pair midway between the walls in the one wall pair tends to be drawn towards each of the walls in the one wall pair to avoid the creation of a space midway between the first and second wall pair without air flow.

2. The food conditioning chest of claim 1 in which the air circulation means includes first duct means for transporting return air from the food well to the air conditioning means and second duct means for transporting intake air from the air conditioning means to the food well.

3. The food conditioning chest of claim 2 in which the air circulation means comprises means for supplying intake air solely through both of the walls of the other of the sidewall pairs.

4. The food conditioning chest of claim 2 in which the air circulation means comprises means for supplying return air solely through both of the walls of the one of the sidewall pairs.

5. The food conditioning chest of claim 4 in which the air circulation means includes a plurality of louvers formed in each of the walls of the one sidewall pair approximately midway between each of the walls of the other sidewall pair.

6. The food conditioning chest of claim 2 in which the air circulation means comprises diverter means disposed in the continuous flow path for diverting return air from at least one of the walls of the one sidewall pair toward at least one of the walls of the other sidewall pair.

7. The food conditioning chest of claim 2 in which the air circulation means includes an intake duct extending downwardly along the at least one of the front wall and fear wall.

8. The food conditioning chest of claim 1 in which the air conditioning means disposed in the continuous flow path includes at least one air heating element.

9. The food conditioning chest of claim 1 in which the at least one fan is located substantially midway between the walls in each of the sidewall pairs.

10. The food conditioning chest of claim 6 in which the fan means comprises a centrifugal fan depending centrally from the tub for circulating air in the food well.

11. The food conditioning chest of claim 1 in which the air circulation means comprises means for supplying intake air solely through both of the walls of the other of the sidewall pairs and means for supplying return air solely through both of the walls of the one of the sidewall pairs.

12. The food conditioning chest of claim 1 including means for preheating return air flowing from the wall towards the air conditioning means.

13. A food conditioning chest for subjecting foodstuffs supported therewithin to a continuous circulation of conditioned air, the food conditioning chest comprising:
    a housing;
    a tub on the housing defining a space for reception of foodstuffs to be subjected to conditioned air in the food conditioning chest,
    said space being bounded by a spaced front and rear wall pair, a spaced end wall pair and a floor,
    said front and rear wall pair and end wall pair cooperatively bounding one of a rectangular and square space; and
    air circulation means including fan means for drawing return air from the tub space through louvers formed in each of the walls in one of the front and rear and end wall pairs and for supplying intake air to the tub space through louvers formed in each of the walls in the other of the front and rear and end wall pairs,
    said air circulation means including a plurality of groups of louvers in each of the walls of the other of the wall pairs for directing intake air angularly downwardly and toward the other of the walls of the other of the wall parts,
    there being one said group of louvers on each wall of the other wall pair located equidistantly from each of the walls in the one wall pair so that air supplied from each of the walls of the other wall pair midway between the walls in the one wall pair tends to be drawn towards each of the walls in the one wall pair to avoid the creation of a space midway between the first and second wall pair without air flow.

14. The food conditioning chest of claim 13 in which the air circulation means includes a return duct extending along the end walls for transporting return air from the food well to the air conditioning means, said air conditioning means including first and second means for separately conditioning air directed through the louvers in each of the other of the front and rear walls and end walls.

15. The food conditioning chest of claim 14 in which louvers are formed in each of the end walls, the return duct extending downwardly along each of the end walls and beneath the tub floor and there is a preconditioning means in the part of the air moving between the louvers in at least one of the end walls and the fan means.

16. The food conditioning chest of claim 14 in which louvers are formed in each of the front wall and the rear wall, the intake duct extending downwardly along each of the front wall and the rear wall.

17. The food conditioning chest of claim 16 in which the intake duct communicates with an intake passage formed beneath the return duct.

* * * * *